United States Patent
Froger et al.

(12)

(10) Patent No.: US 6,183,054 B1
(45) Date of Patent: Feb. 6, 2001

(54) METHOD AND DEVICE FOR DETERMINING THE QUANTITIES OF CONSUMABLE PRODUCTS CONTAINED IN RESERVOIRS GROUPED TOGETHER NEXT TO ONE ANOTHER AND DOCUMENT PRINTING DEVICE USING THIS METHOD

(75) Inventors: Marie-Hélène Froger, Chateaugiron; Pascal Coudray, La Chapelle des Fougeretz, both of (FR)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/104,011

(22) Filed: Jun. 24, 1998

(30) Foreign Application Priority Data

Jun. 27, 1997 (FR) .................................................. 97 08129

(51) Int. Cl.⁷ ............................. B41J 2/195; G01F 23/00
(52) U.S. Cl. ............................................. 347/7; 73/304 C
(58) Field of Search ........................ 73/304 C; 340/612, 340/617; 347/7, 19; 399/27, 61

(56) References Cited

U.S. PATENT DOCUMENTS 5,465,619 * 11/1995 Sotack et al. ....................... 73/304 C
5,495,745   3/1996 Hughes .................................. 73/1 H

FOREIGN PATENT DOCUMENTS 3644095   7/1988 (DE).
93/06572  4/1993 (WO).

* cited by examiner

Primary Examiner—Arthur T. Grimley
Assistant Examiner—Hoan Tran
(74) Attorney, Agent, or Firm—Fitzpatrick, Cella, Harper & Scinto (57) ABSTRACT

Determination of the quantities of products contained in reservoirs grouped together next to one another by using a capacitive arrangement associated with these reservoirs.

According to the invention, electrodes of the capacitive arrangement (121a, 122a–121b, 122b–121c, 122c) respectively associated in pairs with the reservoirs (112a, 112b, 112c) are selected, the transmitted signals (Si) are successively detected, measured and stored, and each measurement is corrected by correction values depending on at least certain of the other measurements.

26 Claims, 5 Drawing Sheets

METHOD AND DEVICE FOR DETERMINING THE QUANTITIES OF CONSUMABLE PRODUCTS CONTAINED IN RESERVOIRS GROUPED TOGETHER NEXT TO ONE ANOTHER AND DOCUMENT PRINTING DEVICE USING THIS METHOD

The invention relates to a method and a device for determining the quantities of consumable products contained in reservoirs grouped together next to one another. It relates to a type of measurement of the available volumes by capacitive means and concerns more particularly an improvement making it possible to improve the accuracy of different measurements in spite of stray capacitive couplings existing between electrodes associated with the different reservoirs.

By way of a preferred application, the invention also concerns a document printing device using the method indicated above.

A number of ways for detecting a level of ink in a reservoir of a printing device are known. Notably, association with the reservoir is known of a capacitive arrangement to which an excitation signal, generally a high frequency alternating signal, is applied. It is known that the signal transmitted by such a capacitive arrangement varies according to the quantity of ink remaining in the reservoir. This variation can therefore be used to indicate to the user the fill level of the reservoir or at least the fact that a minimum level has been reached. Such information allows the user to refill the reservoir or to change a cartridge comprising such a reservoir often associated with an ink-jet print head. The capacitive arrangement is such that at least one capacitor of relatively small capacitance (a few picofarads) is constituted so that the reservoir is located or can be located at a given instant between electrodes of such a capacitor.

By way of example, document EP 0 028 399 describes a method for detecting the minimum level of ink in a reservoir, using a resonant circuit, the capacitor of which is formed by two metal plates (electrodes) between which the ink reservoir is located. The latter therefore fills the dielectric space of such a capacitor and the quantity of ink has a direct effect on the permittivity of the said dielectric space, and therefore the value of the capacitance. The resonant circuit is calibrated so that its resonant frequency and the maximum voltage at its measurement resistance are reached when the level of ink has fallen to a predetermined value. When resonance is achieved, a signal which can be used for signalling is sent. Consequently, with such a system, the only information available is an indication of the fact that the ink level is or is not above a predetermined low threshold.

When the ink level decreases, the measurements become inaccurate and it is difficult to determine the voltage which corresponds exactly to a total absence of ink. This uncertainty leads to provision of a safety margin taking into account the measurement inaccuracy, in order to guarantee a presence of ink at any instant. For example, it may be chosen to send a message when the level is below 20% of the initial level. Once this message has been sent, it is no longer possible to indicate the instant at which the ink runs out completely. This therefore results in a certain wastage. This problem is accentuated when a number of reservoirs containing different coloured inks or pigmented products are used, for example for colour reproduction. These reservoirs are carried by a carriage constrained to move along a guidance means itself arranged facing a print medium movement mechanism. Each reservoir communicates with an output duct connected to a corresponding print head, itself carried by the carriage. Consequently, the reservoirs are grouped together next to one another and, if metal electrodes are associated with each of them in order to constitute a capacitive arrangement suitable for allowing measurements of level in the different reservoirs, stray capacitances may exist between electrodes normally assigned to different reservoirs, which leads to measurement errors. The lower the level of ink measured in a reservoir, the greater the errors, even if large quantities of ink remain in the neighbouring reservoirs.

The invention aims firstly to correct this type of measurement error.

More particularly, the invention concerns a method of determining quantities of consumable products respectively contained in reservoirs grouped together next to one another, of the type using a capacitive arrangement comprising a number of conductive electrodes associated respectively with the said reservoirs, certain of which may be connected to an excitation signal generator and others of which may be connected to detection and measurement means, in order to respectively apply a signal to the said capacitive arrangement and to detect and process a resulting signal transmitted by the latter and representing a quantity of product contained in one of the reservoirs, characterised in that it consists, for each reservoir in turn, of selecting aforementioned electrodes of the said capacitive arrangement in order to apply such a signal across one of the reservoirs, of detecting and measuring the corresponding transmitted signal, then of correcting each measurement by correction values depending on at least certain of the other measurements.

The aforementioned consumable products are generally different. For example, if different coloured inks or pigmented products are concerned, they may have different densities or viscosities, or in general different characteristics.

According to a currently preferred embodiment, the correction values consist of terms each representing the product of another measurement (that is to say relating to another reservoir) and a predetermined corrective coefficient. In practice, the global correction applied to a measurement is the algebraic sum of such terms relating to the other reservoirs. The corrective coefficients depend on the geometry of the reservoirs and their layout with respect to one another. A matrix of correction coefficients is thus defined, which can be stored once and for all, so that the correction consists, after each series of measurements successively using the conductive electrodes assigned to the different reservoirs and making it possible to form a vector of measurement values (that is to say the uncorrected values resulting from the measurements of the transmitted signals, each time, by the capacitive arrangement), of producing the product of this vector and the matrix of correction coefficients in order to obtain a vector of corrected measurement values. These corrected measurement values can then be displayed to inform the user.

According to another advantageous characteristic of the invention, which applies when the reservoirs contain electrically conductive products flowing towards a device electrically connected to a reference potential (for example earth), the method defined above may be supplemented by a series of additional operations, possibly used after comparison of each of the aforementioned corrected measurements with a threshold value or respective threshold values.

Depending on the result of these comparisons, the excitation signal may be changed and aforementioned electrodes selected again in turn in order to apply a second excitation signal successively across each reservoir.

The corresponding transmitted signal is detected and measured and each of these signals is compared with a new predetermined threshold value, possibly specific, and, depending on these comparisons, a control and/or display command is produced.

More precisely, in the method envisaged above, the excitation signals are high-frequency alternating signals, of different frequencies, and consequently the change of excitation signal consists of a change of frequency. During the first part of the method, a relatively high frequency, for example of the order of 5 MHz, is used, while the second part of the method is implemented with a much lower frequency, for example of the order of 10 kHz.

With this second frequency, which is therefore applied only when the reservoir is almost empty, the transmitted signal is relatively constant except when the electrically conductive product disappears in the duct connecting the reservoir to the using device electrically connected to a reference potential. A rise in the voltage transmitted by the capacitive arrangement assigned to the corresponding reservoir is then seen. This transition is clearly perceptible with the second excitation signal, so that, when it occurs, it can be determined that the corresponding reservoir is completely empty or that an operational fault has occurred.

The invention also concerns a device for determining quantities of consumable products respectively contained in reservoirs grouped together next to one another, of the type comprising a capacitive arrangement having a number of conductive electrodes associated respectively with the said reservoirs, certain of them being connected to a first excitation signal generator and others of which may be connected to detection and measurement means, in order to respectively apply a signal to the said capacitive arrangement and detect and process a resulting signal transmitted by the latter and representing a quantity of product contained in a corresponding reservoir, characterised in that it has controlled selection means, in order to successively select electrodes corresponding each time to a reservoir, in order to respectively connect these electrodes to the said generator and to the said detection and measurement means, a processing circuit controlling the said selection means, and storage means for storing measurements of the said transmitted resulting signals, and in that the said processing circuit is capable of correcting the said measurements by correction values depending on at least certain of the other measurements.

Finally, as a preferred implementation, the invention concerns any document printing device having a number of ink reservoirs grouped together next to one another and associated with respective print heads, carried by a carriage constrained to move along guidance means arranged facing a print medium movement mechanism, each reservoir communicating with an output duct connected to the corresponding print head, of the type also having means of determining quantities of ink respectively contained in the reservoirs grouped together next to one another, of the type comprising a capacitive arrangement having a number of conductive electrodes associated respectively with the said reservoirs, certain of which may be connected to a first excitation signal generator and others of which may be connected to detection and measurement means, in order to respectively apply a signal to the said capacitive arrangement and detect and process a resulting signal transmitted by the latter and representing a quantity of ink contained in one of the reservoirs, characterised in that it has controlled selection means, in order to successively select electrodes corresponding each time to a specific reservoir, in order to selectively connect these electrodes to the said generator and to the said detection and measurement means, a processing circuit controlling the said selection means and storage means for storing measurements of the said transmitted resulting signals, and in that the said processing circuit is capable of correcting the said measurements by correction values depending on at least certain of the other measurements.

Where the inks or similar pigmented products contained in these reservoirs are electrically conductive, the print head constitutes a using device electrically connected to a reference potential (earth) and therefore behaves as an impedance "connected" between the output duct of the reservoir and the reference potential. Consequently, it is possible to implement the second part of the method explained above by providing a second excitation signal generator and a switch making it possible to bring one or other of these generators into service, that is to say connect it to the capacitive arrangement.

The first part of the method results in the display of the corrected values indicating the quantities of ink remaining in each reservoir and the second, optionally implemented, part of the method results in the display of a message indicating that a reservoir is completely empty and optionally the production of an alarm signal.

The detection means may include an envelope detector and, in cascade with the latter, an analogue to digital converter connected to convert the signal coming from the envelope detector into digital information. The latter constitute the measurements to which the corrections are next applied.

When the device for determining the quantities of products contained in the reservoirs is associated with a document printing device, the microprocessor-based main processing circuit of this printing device controls the input of information at the detection and measurement means, while the read-only memory associated with this main processing circuit contains, on the one hand, the matrix of correction coefficients and, on the other hand, information representing the quantity of ink remaining in a reservoir, corresponding to the corrected digital information. The printing device also has display means making it possible, among other things, to display information indicating the quantities of ink remaining in the reservoirs and/or a message informing the user of the necessity of taking action, notably to replace or refill such and such reservoir.

The conductive electrodes applied against the walls of the reservoirs may be either metal plates carried by a support, generally forming part of the carriage on which the reservoirs are mounted, or plates fixed directly on the walls of the reservoirs, or metallizations of such walls.

The invention also concerns any automated office machine, characterised in that it has a device for determining the quantities of liquid consumable products remaining in the ink reservoirs they include, in accordance with the preceding definition and using the method defined.

The invention also concerns a document printing device incorporating such a device for determining quantities of ink. Such an automated office machine may for example essentially constitute a colour printer, perhaps a facsimile machine or a microcomputer having at least one device in question.

The invention will be better understood and other advantages of it will emerge more clearly in the light of the following description of a document printing device in accordance with its principle, using the method defined above and including notably a device for determining quantities of ink remaining in the different reservoirs, given solely by way of example and produced with reference to the accompanying drawings in which.

Considering more particularly FIGS. 1 to 4, a colour printer 10 has been depicted, which receives data to be printed DI, representing text or an image, by means of a parallel input/output port 107, connected to an interface circuit 106 itself connected to an ink ejection control circuit 110 which controls the print heads 113a, 113b, 113c, by way of an amplification circuit 114. Each print head is connected to a reservoir of ink or similar pigmented product allowing colour printing. The three reservoirs 112a, 112b and 112c are in fact closely grouped together next to one another and constitute a single exchangeable cartridge 65. These reservoirs contain inks or similar liquid pigmented products, of different colours, in this case magenta (a), cyan (b) and yellow (c) for colour reproduction. Another cartridge 66 constituting a single reservoir contains black ink. Determination of the level of black ink is not part of the invention; for this reason the 112d containing black ink is not depicted on the diagram of FIG. 1. This reservoir is nevertheless associated with a fourth print head similar to the others. The print heads and reservoirs are mounted on a carriage 60 constrained to move along guidance means 67 formed by parallel shafts and rails. The carriage 60 is moved with reciprocating motion along these guidance means. It is driven by a motor 102 by means of a belt mechanism 102a, well known to persons skilled in the art. The movement path of the carriage and therefore of the print heads 113a–113c is parallel to a line to be printed on a print medium such as a sheet of paper. This print medium is moved perpendicular to the movement path of the carriage by the printer mechanism, known per se.

Figure 1:
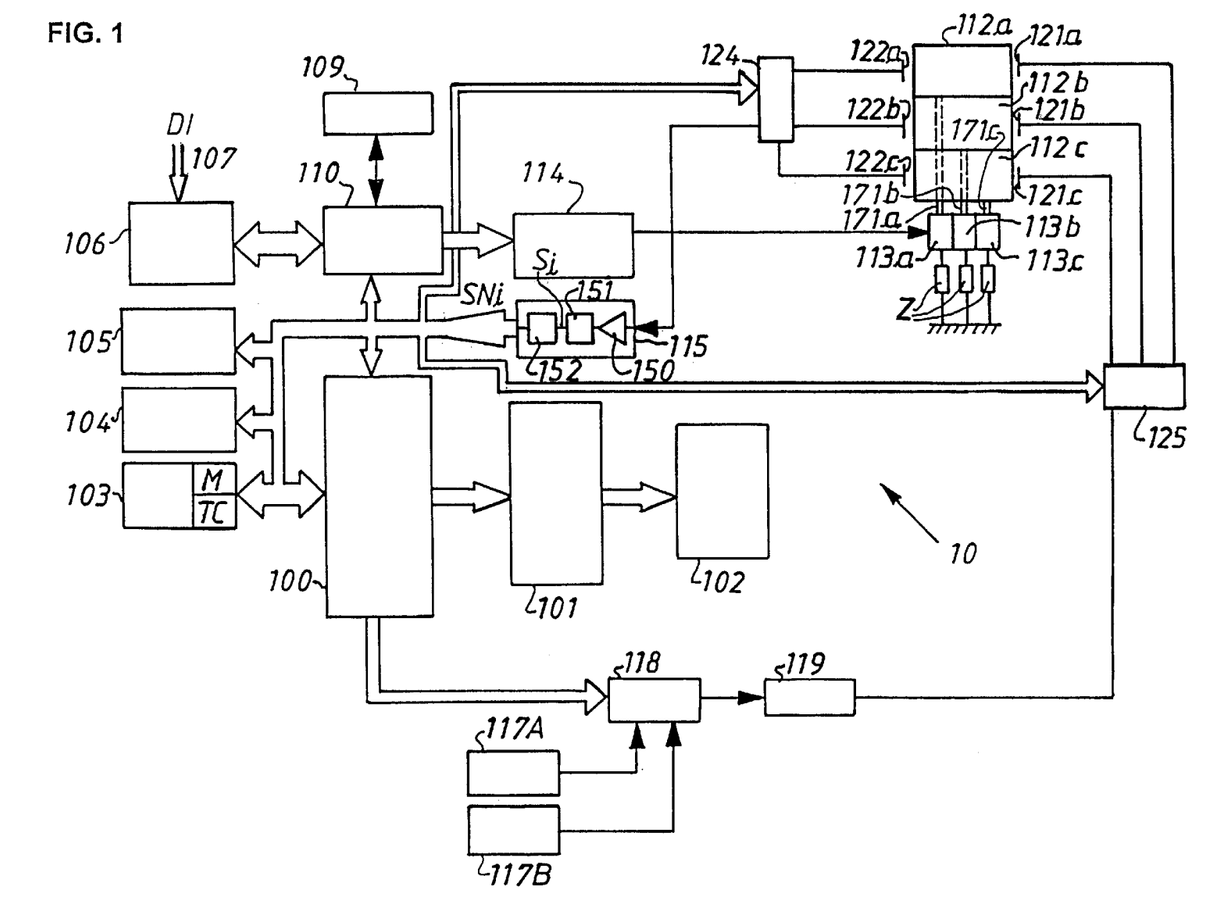
FIG. 1 is a block diagram of a preferred embodiment of the colour printing device.
Figure 2:
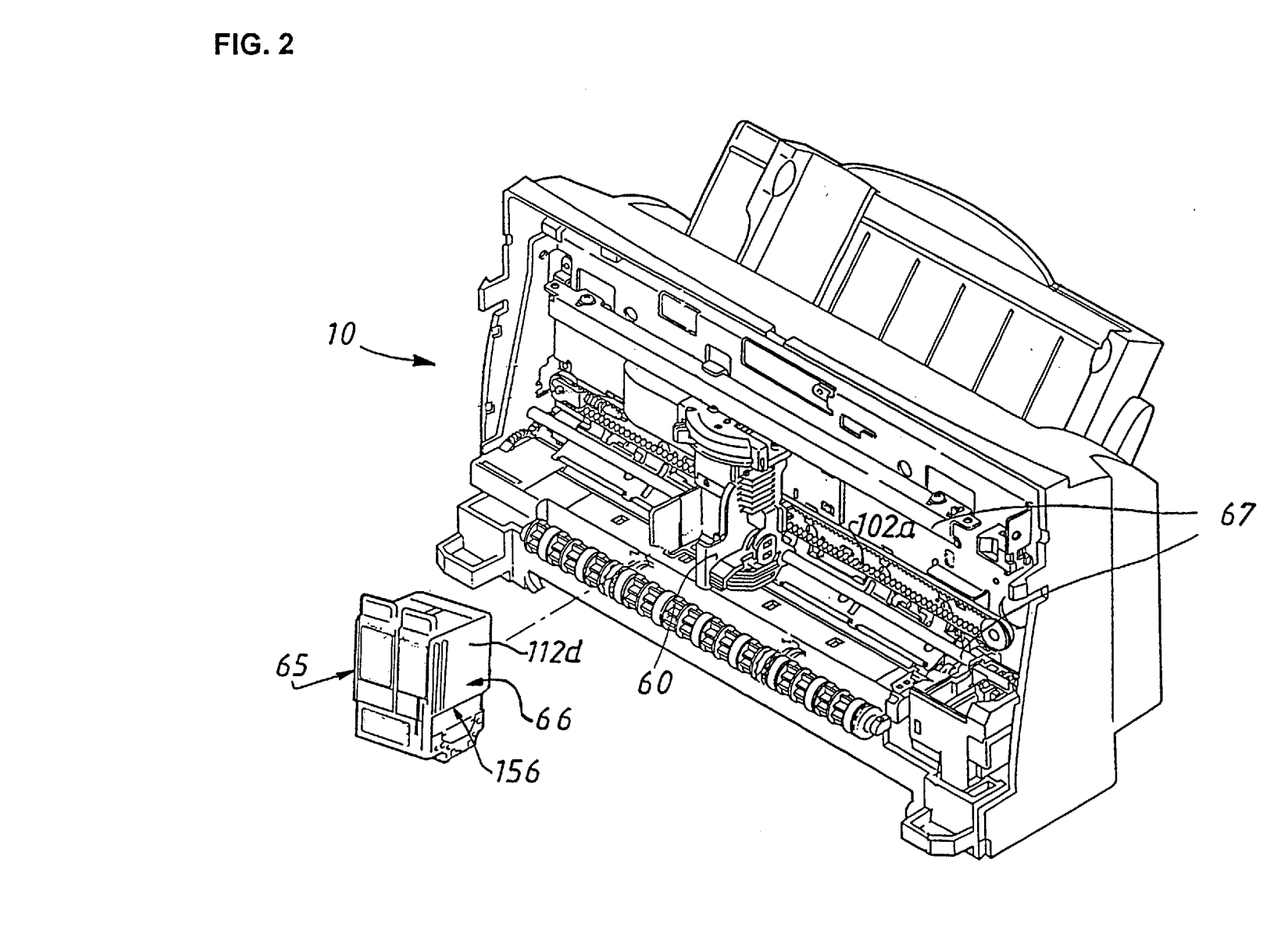
FIG. 2 is a perspective view of this same printing device.

The printer also has a main data processing circuit 100 associated with a read-only memory 103 and a random access memory 109. The read-only memory 103 contains the main processing circuit operating programs while the random access memory 109, also associated with the ink ejection control circuit 110, temporarily stores the data received by means of the interface 106 as well as the data produced by the main processing circuit 100. The latter is connected to a display 104 on which it controls the display of messages representing the operation of the printer and notably, as will be seen later, information on the quantities of ink remaining in the different reservoirs.

The main processing circuit 100 is connected to a keypad 105 by means of which the user can transmit operating commands to the printer. The processing circuit also controls the motor 102 for driving the carriage, by means of an amplification circuit 101. This motor is here advantageously of the stepping type.

The printing device is itself equipped with a device for determining the quantities of pigmented product respectively contained in the reservoirs and more particularly, as regards the invention, in the reservoirs 112a, 112b and 112c grouped together in one and the same cartridge 65. This determination device comprises a capacitive arrangement 108 including at least two metallic conductive electrodes 121, 122 associated with each reservoir. A so-called sending electrode 121 is distinguished, connected to an excitation signal generator 117A or 117B by way, notably, of a switch 118 (controlled by the main data processing circuit 100) and an amplifier 119. On the other hand, a so-called receiving electrode 122 is distinguished, connected to detection and measurement means 115 capable of receiving and processing a signal transmitted by the capacitive arrangement (in fact, part of the latter selected under the control of the main processing circuit 100), the said transmitted signal representing the quantity of product present in a corresponding reservoir.

In FIG. 1, it can be seen that the electrodes 121a, 122a correspond to the reservoir 112a, the electrodes 121b, 122b correspond to the reservoir 112b and the electrodes 121c, 122c correspond to the reservoir 112c. The forms and characteristics of these electrodes will be described in detail later.

The detection and measurement means 115 are connected to the said receiving electrodes by way of first controlled selection means 124 making it possible to successively and cyclically select an electrode (possibly a group of electrodes) associated each time with a particular reservoir of the cartridge 65 in order to successively determine the quantities of products remaining in the different reservoirs, during one measurement cycle. Such a measurement cycle may for example take place before the printing of a document. Likewise, the excitation signal generator 117A or 117B, according to the state of the switch 118, is connected to the said sending electrodes, by way of second controlled selection means 125, making it possible to successively and cyclically select an electrode (possibly a group of electrodes) associated each time respectively with the same aforementioned particular reservoir, that is to say the reservoir for which an attempt is being made to measure the quantity of product it contains.

In the example, the excitation signal generator 117A is a relatively high-frequency alternating signal generator while the excitation signal generator 117B is a lower-frequency alternating signal generator. Typically, the frequency of the generator 117A is of the order of 5 MHz while the frequency of the generator 117B is of the order of 10 kHz. The first and second selection means 124, 125 are controlled by the main processing circuit 100. The aforementioned detection and measurement means 115 include an envelope detector 151 connected to be linked to at least one receiving electrode selected by means of the said first selection means 124. An amplifier 150 is inserted between the selection means 124 and the input of the envelope detector. It has an input impedance of the order of 1 MΩ. These detection and measurement means 115 also include an analogue to digital converter 152 connected to convert a signal Si coming from the envelope detector into digital information SNi. This digital information is transmitted to the main processing circuit 100 and used by it.

In particular, the read-only memory 103 contains a matrix of predetermined correction coefficients M usable for correction of the measurements represented by the digital information SNi. As for the random access memory 109, this is capable of temporarily storing the measurement values SNi for the three reservoirs. The read-only memory 103 also contains a look-up table TC where information representing the quantity of pigmented product remaining in a reservoir appears in correspondence with the digital information corrected, according to the invention, from the digital information SNi and the matrix of correction coefficients M.

Figure 4:
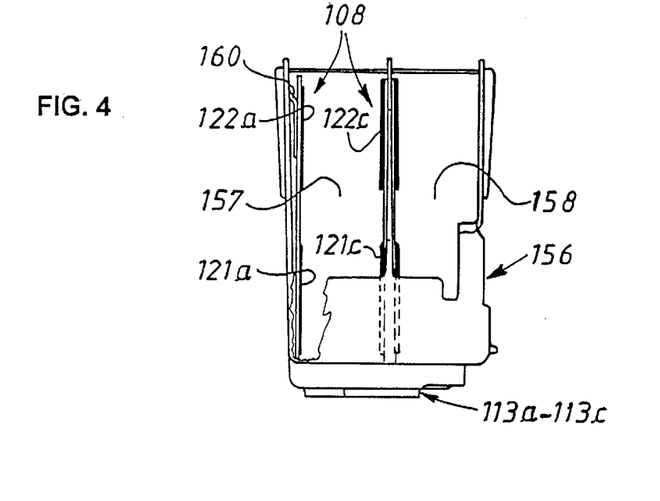
FIG. 4 is a detailed view, with cutaway, of part of the carriage, forming a support on which the cartridge of FIG. 3 is mounted and which carries conductive electrodes of the capacitive arrangement.

The cartridge 65 combining the three reservoirs 112a–112c and the cartridge 66 constituting on its own the 112d are installed side by side on a support 156 carried by the carriage 60. The two cartridges are removable and exchangeable. The print heads 113a–113c (and the print head supplied by black ink) are located at the lower part of the support 156. The print heads are therefore installed permanently on the carriage 60.

According to another possible embodiment, the three reservoirs 112a–112c and the corresponding print heads 113 may be combined in one and the same exchangeable cartridge. If the reservoirs form one exchangeable cartridge, one of the messages produced by the main processing circuit can indicate the necessity of changing the cartridge as soon as one of the reservoirs is empty. If, on the contrary, the reservoirs are intended to be refilled when this is necessary, they can each have a refilling aperture and one of the messages produced by the main processing circuit can indicate the necessity of refilling such and such reservoir. The support 156 has two sockets, a socket 157 intended to receive the cartridge containing the reservoirs 112a–112c and a socket 158 intended to receive the cartridge containing the black ink reservoir. The socket 157 has parallel walls carrying the electrodes 121 or 122 associated with the three reservoirs 112a–112c. Each electrode is here composed of a metal plate. At least one electrode per reservoir may advantageously be applied by elastic stressing means against the wall of the corresponding cartridge. Such stressing means may be implemented by a leaf spring 160 or similar interposed between one wall of the support and a movable insulating wall carrying certain electrodes. However, the electrodes may be defined by metallizations deposited on external surfaces of the cartridge constituting the three reservoirs. The form of these metallized electrodes appears in broken lines in FIGS. 3A and 3B. In this case, the support 156 may define a simple structure for housing the cartridges and carry electrical connection elements making it possible, by simple contact, to connect the different electrodes to the selectors 124 and 125.

Figure 5:
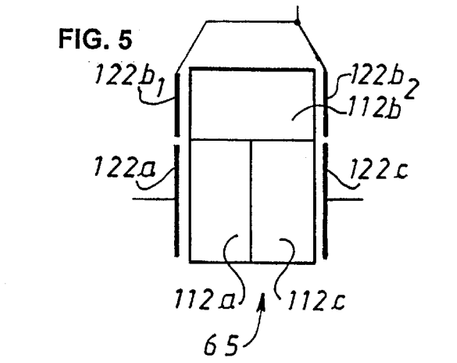
FIG. 5 is a schematic view of the cartridge, along a section V—V of FIG. 3A, with the corresponding electrodes.

This layout of electrodes is possible, in view of the arrangement of the reservoirs constituting the cartridge, on account of each reservoir containing a conductive pigmented product. Its walls, that is to say the walls of the cartridge, are made of an insulating material, for example plastic. The three reservoirs 112a–112c are disposed side by side over substantially the whole height of the cartridge. In other words, this cartridge is composed of the juxtaposition of three independent reservoirs, the reservoir 112a for magenta, the reservoir 112b for cyan and the reservoir 112c for yellow. The reservoirs 112a and 112c each extend over half the width of the cartridge while the reservoir 112c extends from one lateral wall to the other. This layout of the reservoirs with respect to one another appears in FIG. 5. Because of this particular configuration of the cartridge, the electrodes 121a and 122a are disposed one above the other on the same lateral wall of the cartridge, on the reservoir 112a side, and the electrodes 121c and 122c are disposed on the opposite lateral wall of the cartridge, one above the other, on the reservoir 112c side. For the reservoir 112b, each electrode is divided into two parts joined together by electrical conductors. Each part has approximately a surface area equal to half that of an electrode 121 or 122 of one of the other two reservoirs. The two parts are respectively referenced 121b1, 121b2 as regards the sending electrode of the reservoir 112b, and 122b1, 122b2 as regards the receiving electrode associated with this same reservoir 112b. In fact, it can be considered that the two parts 121b1 and 121b2 constitute one and the same sending electrode 121b while the two parts 122b1 and 122b2 constitute one and the same receiving electrode 122b. Each electrode or electrode part has a rectangular form and is thus located applied against a plane face of the reservoir corresponding to it. These electrodes form part of capacitors of the capacitive arrangement 108. The equivalent electrical diagram of FIG. 6 can be assigned to any one of the reservoirs 112 provided with its two electrodes 121 and 122 and associated with the corresponding print head 113. The so-called "sending" electrode 121, with the corresponding reservoir 112, defines a capacitor C1, the dielectric of which is constituted by the wall 165, made of insulating plastic material, of the reservoir itself. In the same way, the electrode 122, with the reservoir, defines a capacitor C2, the dielectric of which is constituted by the same wall of insulating material. The reservoirs are filled with a porous body impregnated with conductive ink.

Figure 6:
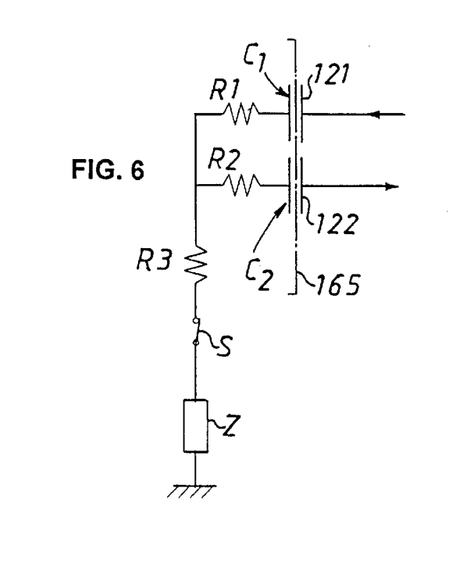
FIG. 6 is an equivalent electrical diagram of part of the capacitive arrangement associated with a reservoir of the cartridge and with the corresponding print head.

Consequently, this porous body impregnated with conductive liquid constitutes the other electrodes of each of the capacitors C1 and C2. Under these conditions, resistors R1 and R2 are inserted in series between the capacitors C1 and C2. A resistance R3 is inserted between the common point of the resistors R1 and R2 and the impedance Z constituted by or representing the print head (from the electrical point of view). The other "terminal" of the impedance Z is connected to earth. A normally closed switch S is inserted between the resistor R3 and the impedance Z. This switch in fact represents the ink flow duct 171 between the output of the reservoir and the print head. It can be considered that this switch S is closed as long as there remains conductive ink in this small-sectioned duct. This can occur in a case of faulty operation but especially when the reservoir is completely empty. This phenomenon is taken advantage of, as will be seen later, for detecting the instant a reservoir is totally empty. When the reservoir empties, the capacitances of the capacitors C1 and C2 progressively decrease and, at the same time, the values of the resistors R1 to R3 increase. Finally, when the ink runs out in the duct 171 which connects the reservoir to the print head, everything happens as if the switch S were opened, therefore isolating the part of the capacitive arrangement associated with this reservoir from the corresponding print head and consequently from earth. The effect of this phenomenon is a sudden and significant rise in the voltage transmitted by the corresponding part of the capacitive arrangement.

Figure 7:
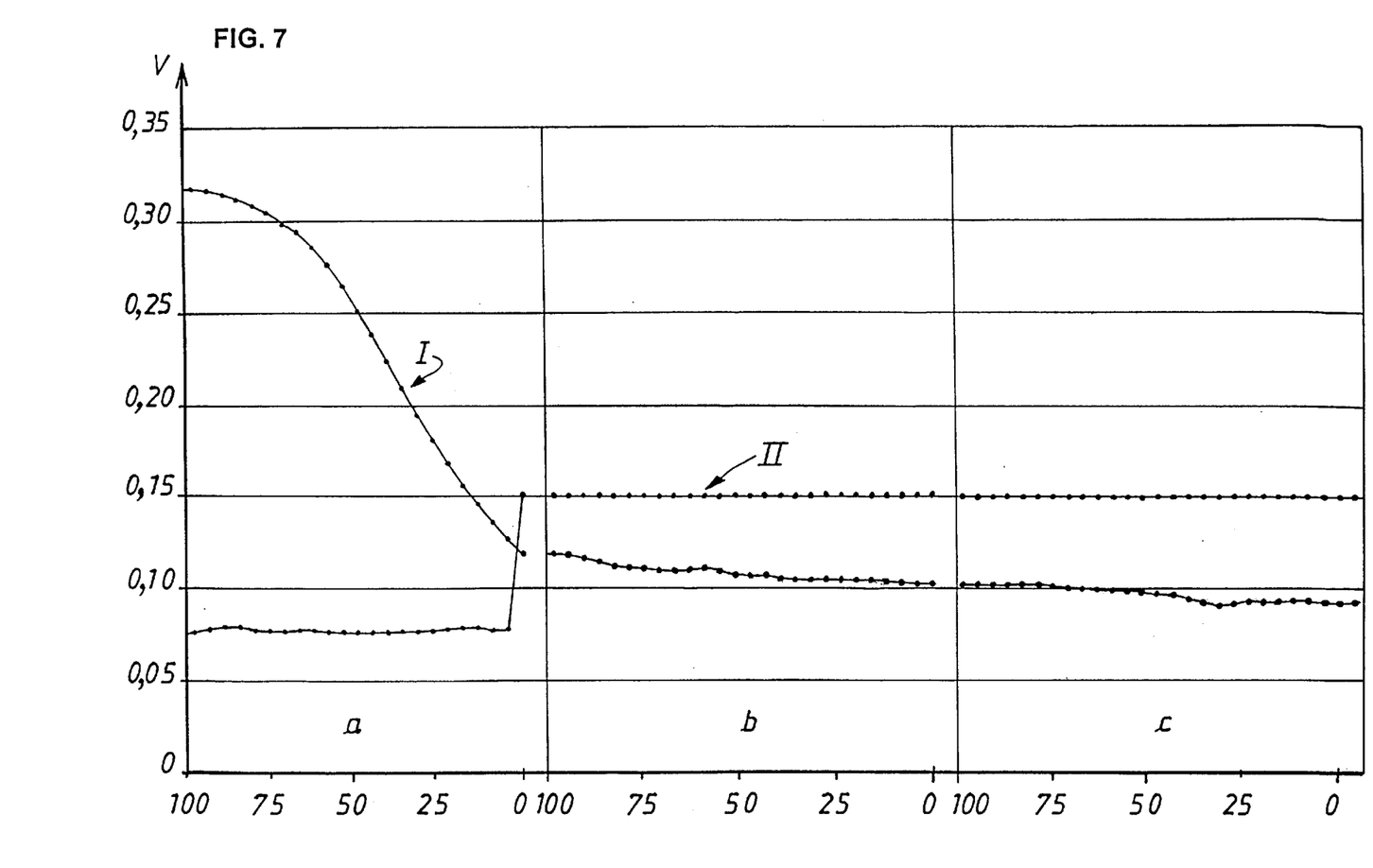
FIG. 7 is a graph illustrating the voltage of the signal transmitted by the capacitive arrangement according to the quantity of ink remaining in a reservoir while this reservoir and the adjacent reservoirs are emptied completely and successively.

The graph of FIG. 7 depicts the change in the signal V transmitted by part of the capacitive arrangement associated with a given reservoir, here the reservoir 112a, while successively emptying this reservoir and then the other two. In other words, on the x-axis, the first third of the graph (a) corresponds to the complete draining of the reservoir 112a, the sending and receiving electrodes of which are effectively connected to one of the oscillators 117, on the one hand, and to the detection and measurement means 115, on the other hand. The second (b) and third (c) thirds correspond to the change in the alternating voltage transmitted under the same conditions, while the other two reservoirs 112b and 112c are successively emptied. The curve I is obtained using the high-frequency oscillator 117A, of the order of 5 MHz, while the curve II is obtained using the lower-frequency oscillator 117B, of the order of 10 kHz. On the y-axis, the graduations represent successively the fill levels of each reservoir, expressed as a percentage of the initial volume.

Considering the curve I, it should be noted that the transmitted signal essentially decreases from 0.32 to 0.11 volts while the reservoir corresponding to the electrodes in service is emptied. It must however be noted that, while the other two reservoirs are emptied, which corresponds to the other two zones, the measured voltage decreases by another 27 millivolts, which is attributable to the stray capacitances between the capacitors associated with the adjacent reservoirs.

On the curve II, on account of an oscillator with a lower frequency being used, the impedance of the print head has a low value, which tends to reduce the effect of the variation in the level of ink on the transmitted signal. On the other hand, the sudden variation between 0.075 volts and 0.15 volts is attributable to the disappearance of ink in the duct 171.

These two curves are used one after the other, within the context of the invention.

Firstly, the invention consists of making necessary corrections to the measurements corresponding to the curve I (that is to say with a frequency of 5 MHz) to take account of stray capacitances.

The means for determining the quantities of pigmented products contained in the reservoirs, as just described, are used under the control of the processing circuit 100 associated with the read-only memory 103 and the random access memory 109. A program for controlling the operations is stored in the read-only memory 103. This program obeys the algorithm depicted in FIG. 8. It comprises twenty steps referenced E70 to E89. These steps are passed through periodically at certain times in the operation of the printing device, for example before printing a document. The aim of this algorithm is, on the one hand, to determine the quantities of ink present in the reservoirs 112a–112c and, possibly, to produce messages intended to attract the attention of the user, notably to change a cartridge when a reservoir is completely empty or to fill the said reservoir, if this is possible.

Figure 8:
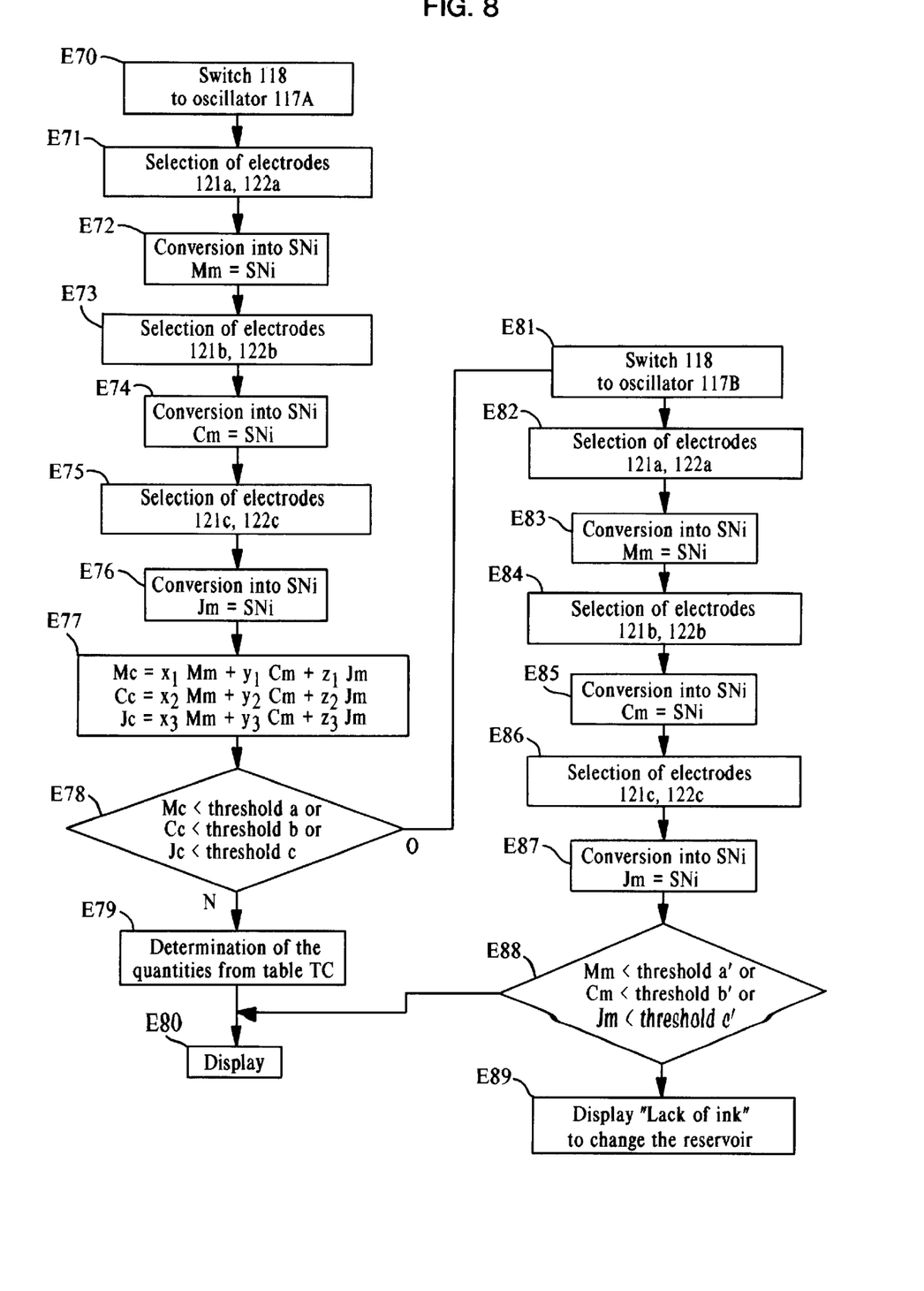
FIG. 8 is a flow diagram of a program implementing the method of the invention.

The initial step E70 consists of positioning the switch 118 to allow passage of the signal delivered by the oscillator 117A to the amplifier 119. This step is controlled by the main processing circuit 100.

The step E71 concerns positioning of the selection means 124 and 125 to select electrodes of the capacitive arrangement corresponding to the reservoir 112a. The selection means 124, 125 are therefore controlled to connect the electrode 121a to the output of the amplifier 119 and the electrode 122a to the input of the detection and measurement means 115.

At the step E72, the signal transmitted by the electrode 122a is converted into digital information SNi. This information is stored in the random access memory 109 in a variable Mm. This is the measured value of the level of magenta ink or pigmented product.

The steps E73 and E74 are respectively identical to the steps E71 and E72 (with activation of the selection means 124, 125 to select the electrodes 121b and 122b) in order to measure and store the level of cyan ink in the variable Cm.

The steps E75 and E76 are respectively equivalent to the steps E71 and E72, to select the electrodes 121c and 122c, in order to measure and store the level of yellow ink in the variable Jm.

The step E77 will consist of correcting each measurement Mm, Cm and Jm by correction values depending on at least certain of the other measurements.

More precisely, this operation consists of correcting each measurement by adding thereto, or subtracting therefrom, correction values, the latter here representing the product of another measurement and a predetermined corrective coefficient. The result is thus determination of the values of the corrected measurements represented by the variables Mc for magenta, Cc for cyan and Jc for yellow. The correction consists of a simple matrix calculation from the vector (Mm, Cm, Jm) stored in the memory 109 and the matrix MT stored in the read-only memory 103.

Figure 3A:
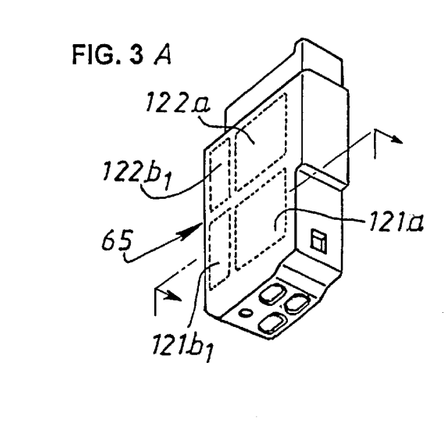
FIGS. 3A and 3B are perspective views of one and the same cartridge containing notably three reservoirs.
Figure 3B:
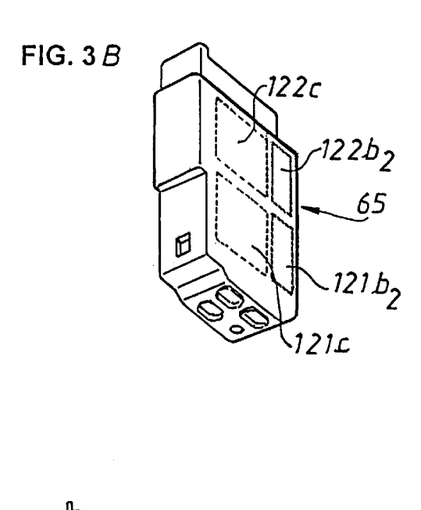

By way of example, for a cartridge containing three reservoirs of the kind described with reference to FIGS. 3A and 3B, the matrix of correction coefficients is as follows:

$$\begin{pmatrix} x_1 y_1 z_1 \\ x_2 y_2 z_2 \\ x_3 y_3 z_3 \end{pmatrix} \equiv \begin{pmatrix} 1 & -0.103 & -0.053 \\ -0.103 & 1 & 0.053 \\ -0.053 & -0.053 & 1 \end{pmatrix}$$

The correction therefore consists of applying the following matrix calculation:

$$\begin{pmatrix} Mc \\ Cc \\ Jc \end{pmatrix} = \begin{pmatrix} x_1, y_1, z_1 \\ x_2, y_2, z_2 \\ x_3, y_3, z_3 \end{pmatrix} \times \begin{pmatrix} Mm \\ Cm \\ Jm \end{pmatrix}$$

A variant may consist of using this correction only when the level of ink in at least one of the reservoirs (and its corresponding measurement) becomes lower than a certain value, for example 20% of the initial value. Where the level is higher levels (and their corresponding measurements) are higher for all the reservoirs, the coefficients $y_1$, $z_1$, $x_2$, $z_2$, $x_3$ and $y_3$ are set to zero.

The step E78 consists of comparing each corrected value Mc, Cc and Jc with a threshold value, possibly specific, a, b or c, respectively. If none of the corrected measurement values is less than the corresponding threshold, the quantities of ink remaining are calculated by virtue of the table TC stored in read-only memory (step E79). At the step E80, the three values are displayed.

If one of the corrected measurement values Mc, Cc or Jc is less than the threshold corresponding to it, the process goes to the step E81, where the main processing circuit 100 controls the switch 118 in order to substitute the oscillator 117B for the oscillator 117A. The following operations consist of repeating the measurements, reservoir by reservoir, with the new frequency corresponding to the curve ll. Thus the step E82 consists of controlling the selection means 124, 125 to bring the electrodes 121a, 122a into service in order to perform a new measurement relating to the reservoir containing magenta ink.

At the step E83, the measured value is digitised and stored in order to give a new value to the variable Mm. The steps E84 and E85 correspond respectively to the steps E82 and E83 and result in a new value of variable Cm. The steps E86 and E87 correspond respectively to the steps E82 and E83 for yellow and result in the storing of a new value of variable Jm.

The test E88 consists of comparing each new variable Mm, Cm and Jm with a threshold value or respective threshold values, for example a', b' and c'. The aim of this comparison is to determine whether the signal transmitted at this new frequency is close to 0.07 volts or on the contrary close to 0.15 volts. The decision threshold may, for example, be situated around 0.12 volts. If all the values of the variables Mm, Cm and Jm are less than their respective thresholds, the step E80 is returned to, controlling the display of the last values determined at the step E79. If, on the contrary, at least one of the values is greater than the corresponding threshold, this means that there is no ink in the linking duct which extends between the corresponding reservoir and the print head and that, consequently, printing of the document is no longer possible. In this case, the step E89 is moved to, which consists of displaying a message asking the user to change the cartridge or the reservoir or, if this is possible, to refill the reservoir. This display may be accompanied by an alarm.

What is claimed is:

1. A method for determining quantities of consumable products respectively contained in plural reservoirs, each said plural reservoirs being provided with a capacitive arrangement having first and second conductive electrodes of which the first conductive electrode is connectable to an excitation signal generator and of which the second conductive electrode is connectable to detection and measurement means, such that an excitation signal applied to a capacitive arrangement for one of said plural reservoirs results in a signal representing a quantity of product contained in said one of the plural reservoirs, comprising the steps of:

selecting electrodes of a capacitive arrangement for one of said plural reservoirs in order to apply an excitation signal across said one of the plural reservoirs;

detecting and measuring the corresponding resulting signal; and correcting the measurement of the resulting signal by correction values that depend on at least measurements of resulting signals for others of the plural reservoirs.

2. A method according to claim 1, wherein said correcting step includes correcting each of plural measurements by adding thereto, or subtracting therefrom, said correction values.

3. A method according to claim 1 or claim 2, wherein each measurement is corrected by algebraically adding thereto, terms each representing the product of another measurement and a predetermined corrective coefficient.

4. A method according to claim 1 or claim 2, further comprising the step of displaying the corrected measurement values.

5. A method according to claim 1 or claim 2, further comprising, for each reservoir, the steps of transforming said resulting signal into digital information, storing said digital information, and calculating, after digitally transformed measurements have been stored for each of said plural reservoirs, corrected measurements by performing a matrix calculation using a matrix of predetermined correction coefficients and said digitally transformed measurements.

6. A method according to claim 5, wherein said correcting step is applied only if at least one of the resulting signals has a value less than a preselected threshold.

7. A method according to claim 1 or claim 2, further comprising the steps of comparing each corrected measurement with a threshold value, determining whether to change the excitation signal depending on the result of said comparing step, and in the case of a change of excitation signal, selecting electrodes of each said reservoir in turn, applying a second excitation signal, detecting and measuring corresponding resulting signals for each said reservoir, comparing each of said resulting signals with a predetermined threshold value, and, depending on said comparing step, producing a control and/or display command.

8. A method according to claim 7, wherein the excitation signals are high-frequency alternating signals of different frequencies, and wherein the change of excitation signal consists of a change of frequency.

9. A device for determining quantities of consumable products respectively contained in plural reservoirs, each said plural reservoirs being provided with a capacitive arrangement having first and second conductive electrodes of which the first conductive electrode is connectable to a first excitation signal generator and of which the second conductive electrode is connectable to detection and measurement means, such that an excitation signal applied to the capacitive arrangement for one of said plural reservoirs results in a resulting signal representing a quantity of product contained in said one of said plural reservoirs, comprising:

selection means controllable to successively select electrodes corresponding to each of said plural reservoirs, in order to successively connect selected electrodes to said excitation signal generator and to said detection and measurement means;

a processing circuit controlling said selection means; and storage means for storing measurements of said resulting signals, wherein said processing circuit corrects a measurement of a resulting signal for one reservoir by correction values that depend on at least measurements of resulting signals for others of said plural reservoirs.

10. A device according to claim 9, further comprising a memory containing information representing predetermined correction coefficients.

11. A device according to claim 9 or claim 10, further comprising display means controlled by said processing circuit in order to display corrected measurement values and/or messages.

12. A device according to claim 9 or claim 10, wherein said first excitation signal generator is a high-frequency alternating signal generator.

13. A device according to claim 12, wherein the plural reservoirs each contain electrically conductive products flowing towards a device electrically connected to a reference potential, and further comprising a second excitation signal generator which includes a high-frequency alternating signal generator with a frequency different from that of the said first excitation signal generator, and controlled switching means, connected to link one of said first or said second excitation signal generator to said selection means, under the control of the said processing circuit.

14. A device according to claim 9 or claim 10, wherein said detection and measurement means includes an envelope detector connected to be linked to the capacitive arrangement by said selection means.

15. A device according to claim 9 or claim 10, wherein said detection and measurement means includes an analog to digital converter connected to convert a signal coming from the envelope detector into digital information.

16. A document printing device comprising:

plural ink reservoirs with each ink reservoir communicating with a respective print head through an output duct;

a carriage for carrying said print heads and constrained to move along guidance means arranged facing a print medium movement mechanism;

quantity determining means for determining quantities of ink respectively contained in each of said plural reservoirs, said quantity determining means including for each of said plural reservoirs, a capacitive arrangement having first and second conductive electrodes of which the first conductive electrode is connectable to a first excitation signal generator and of which the second conductive electrode is connectable to detection and measurement means, such that an excitation signal applied to said capacitive arrangement for one of said plural reservoirs results in a resulting signal representing a quantity of ink contained in said one of the plural reservoirs;

selection means controllable to successively select electrodes corresponding to each of said plural reservoirs, in order to successively connect selected electrodes to said excitation signal generator and to said detection and measurement means;

a processing circuit controlling said selection means; and storage means for storing measurements of said resulting signals, wherein said processing circuit corrects a measurement of a resulting signal for one reservoir by correction values that depend on at least measurements of resulting signals for others of said plural reservoirs.

17. A device according to claim 16, further comprising a memory containing information representing predetermined corrective coefficients.

18. A device according to claim 16 or claim 17, further comprising display means controlled by said processing circuit in order to display corrected measurement values and/or messages.

19. A device according to claim 16 or claim 17, wherein said first excitation signal generator is a high-frequency alternating signal generator.

20. A device according to claim 19, wherein the plural reservoirs each contain electrically conductive inks and wherein respective print heads are electrically connected to a reference potential, and further comprising a second excitation signal generator which includes a high-frequency alternating signal generator with frequency different from that of said first excitation signal generator, and controlled switching means connected to link one of said first or second excitation signal generator to said selection means, under the control of the said processing circuit.

21. A device according to claim 16 or claim 17, wherein said detection and measurement means includes an envelope detector connected to be linked to the capacitive arrangement by said selection means.

22. A device according to claim 16 or claim 17, wherein said detection and measurement means includes an analog to digital converter connected to convert a signal coming from said envelope detector into digital information.

23. A device according to claim 17, further comprising a memory containing information representing a quantity of ink remaining in a reservoir, corresponding to the corrected measurements.

24. Automated office machine, having a device according to claim 16 or claim 17.

25. Automated office machine according to claim 24, essentially comprising a printer.

26. Microcomputer embodying a processing circuit according to claim 16 or claim 17.

* * * * *